United States Patent [19]

Vaiden

[11] Patent Number: 4,637,501
[45] Date of Patent: Jan. 20, 1987

[54] GEAR MOTOR DECOUPLING DEVICE

[75] Inventor: John C. Vaiden, Wayne, N.J.

[73] Assignee: Simmonds Precision, Tarrytown, N.Y.

[21] Appl. No.: 721,543

[22] Filed: Apr. 9, 1985

[51] Int. Cl.⁴ ............................................. F16D 11/04
[52] U.S. Cl. .................................... 192/20; 192/93 R
[58] Field of Search ................. 192/99 S, 99 A, 89 A, 192/93 R, 67 R, 20; 74/96, 594.1; 403/307, 343

[56] References Cited

U.S. PATENT DOCUMENTS

| | | | |
|---|---|---|---|
| 2,092,104 | 9/1937 | Bowden | 192/89 A X |
| 2,561,235 | 7/1951 | Schmutzler | 192/89 A |
| 2,660,278 | 11/1953 | Landwier | 192/93 R |
| 3,481,437 | 12/1969 | Araikawa . | |
| 3,922,929 | 12/1975 | Marchello | 74/594.1 X |
| 3,934,688 | 1/1976 | Sides et al. . | |
| 4,213,504 | 7/1980 | Schneider | 403/307 X |
| 4,474,218 | 10/1984 | Sample | 192/67 R X |
| 4,542,812 | 9/1985 | Westley | 192/20 X |

Primary Examiner—George H. Krizmanich
Attorney, Agent, or Firm—Harry Williams

[57] ABSTRACT

A decoupling device for gear motors used in cargo conveyor belt systems in which a coupler member is free to move axially on the output shaft of the gear motor to cooperate with the final gear of the gear train in the motor housing. A spring member maintains the coupler in engagement with the final gear via the corresponding jaw structures. Disengagement of the respective jaw structures is accomplished by axially moving the coupler member along the output shaft by means of a self-securing pivotally mounted yoke which engages the coupler for transmitting axial motion thereto. The yoke is pivoted by means of a cam follower device mounted for pivotal movement exteriorly of the gear housing to thereby rotate to one of two positions, thus connecting or disconnecting the aforementioned respective jaw structures on the output shaft.

6 Claims, 5 Drawing Figures

GEAR MOTOR DECOUPLING DEVICE

BACKGROUND OF THE INVENTION

This invention is related to mechanical decoupling devices for gear motors having a driven load, such as conveyor belts and the like, particularly cargo conveyor belts in an airborne environment.

In airborne applications gear motors are used to drive cargo conveyor belts, and the motors themselves are usually located below the cargo and are therefore inaccessible when the cargo is in place. In a typical application the gear motor incorporates a normally engaged brake which requires auxiliary power, electric or hydraulic, for release. Should auxiliary power be unavailable to release the brake, manipulation of the cargo is severly handicapped by the locked brake, thus necessitating disruption of the cargo movement operation in order to gain access to the gear motor. In such cases, therefore, there is a need for some kind of manual release so that the cargo movement operation can continue while the brake is being repaired or replaced.

OBJECTS AND SUMMARY OF THE INVENTION

It is the primary purpose and principle object of the present invention to provide a remotly operated decoupling device which can decouple the gear motor manually without the need for auxiliary power. Ancilliary objects and purposes of the invention are the provision of a decoupling device for gear motors in which the device operates independently of the gear action of the motor and therefore imposes no load or wear and which employs a few simple parts, each of which serve multiple functions.

Specifically, the present invention provides a jaw clutch mechanism for driving the output shaft of the gearing associated with the gear motor. A coupler member comprising a ring or bushing structure is free to move axially on a hexagonal section of the output shaft of the gear motor and is provided with integrally machined jaws that cooperate with corresponding jaws on the final gear of the gear train, the final gear being mounted on the output shaft. A spring member maintains the coupler in engagement with the final gear via the corresponding jaw structures. Disengagement of the respective jaw structures is accomplished by axially moving the coupler member along the output shaft by means of a pivotally mounted yoke which engages the coupler for transmitting axial motion thereto. The yoke itself is pivoted by means of a cam follower device mounted for pivotal movement exteriorly of the gear housing and connected to the yoke by an axle which is threaded into the yoke such that the reisisting torque provided by the cam follower action tightens the threaded joint. A cam device, also pivoted exteriorly of the gear housing, causes the cam follower to rotate to one of two positions, thus connecting or disconnecting the aforementioned respective jaw structures on the output shaft. In providing stability in either of the two positions, engagement and disengagement of the jaw-clutch, the cam device provides an extend stop as well as its lift function, and the cam follower, in addition to stabilizing the cam device, provides a retract stop as well as its lift function.

The invention will be better understood as well as further objects and advantages thereof become more apparent from the ensuing detailed description taken in conjunction with the drawings.

DETAILED DESCRIPTION

Figure 1:
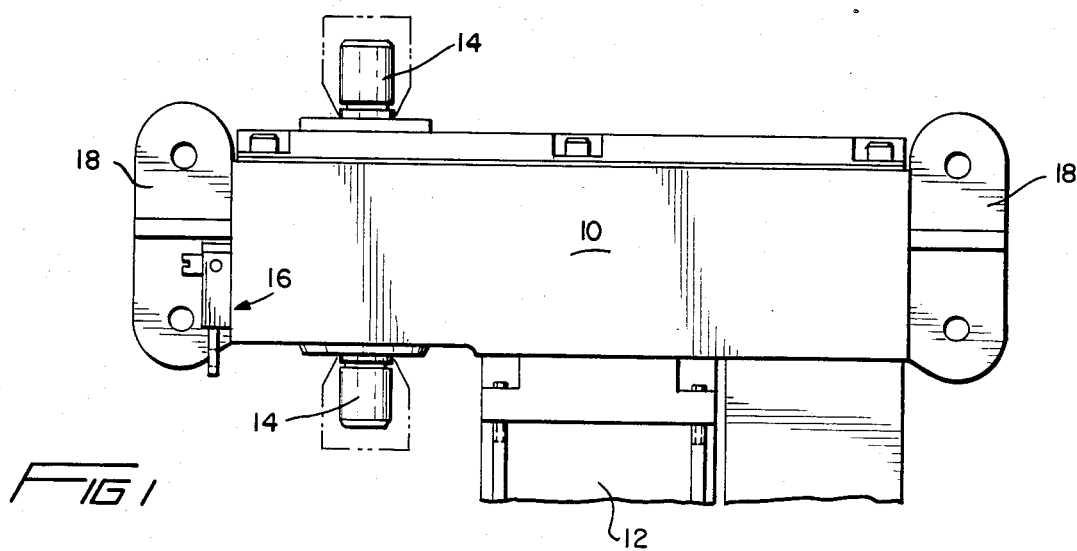
FIG. 1 is a schematic plan view of the gear motor housing and the exteriorly mounted decoupling device according to the invention.

Referring now to FIG. 1, there is shown a gear housing 10 for a motor 12 attached thereto. In the left portion of the housing 10 can be seen an output shaft 14 extending through the housing. To the left of the output shaft 14 on the exterior of the housing 10 are the cam and cam-follower of the decoupling device, generally designated as 16. Support brackets 18 for the housing 10 are provided for securing the entire mechanism at an appropriate location in a cargo conveyor belt system. As will be explained in greater detail below, operation of the decoupling device 16 by actuating the cam and cam-follower mechanism disconnects or engages the output shaft 14 from the drive gear train in housing 10. Actuation of the cam is normally accomplished by an actuating rod or some such other manually operable means, although it is to be understood that such a manually operable means can be assisted by a power means, either electrical or hydraulic or both.

Figure 2:
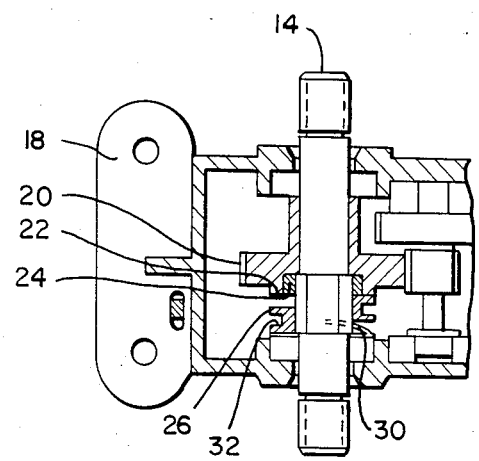
FIG. 2 is a schematic plan view, partially broken away, of the gear motor housing shown in FIG. 1.
Figure 3:
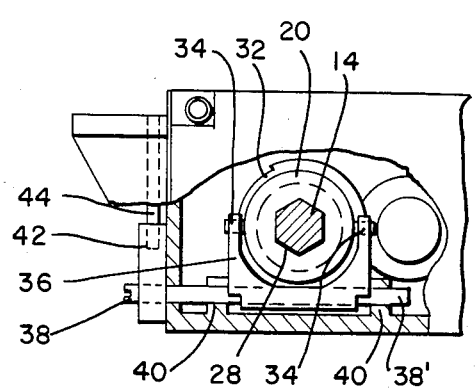
FIG. 3 is a schematic elevation view, partially broken away, of the gear motor housing shown in FIG. 1.

In FIG. 2 there is shown the output shaft 14 in greater detail, wherein the final drive gear 20 of a gear train is mounted for free rotation on the output shaft 14. This final gear 20 is provided on its underside, as shown, with an annular toothed member 22 in the form of integrally machined jaws which form part of the jaw-clutch structure. The remaining part of the jaw-clutch structure is likewise formed as a corresponding annular toothed member 24 on the top side of a coupler member 26. Together the annular members 22 and 24 form the clutch jaw-structure for the decoupling device. The coupler 26 comprises a ring member which is free to slide axially along the output shaft 14 on a hexagonal portion 28 thereof, as best shown in FIG. 3. A spring 30 of an overcenter design, for example, a curved spring washer surrounding the output shaft 14, biases the coupler 26 towards the final gear 20 so that the clutch jaw structure defines an engagement of the annular members 22 and 24.

The coupler 26 further comprises a flange 32 for cooperating with a pair oppositely disposed stud members 34 supported by a yoke member 36 which in turn is pivotally supported by an axle 38,38', as best shown in FIG. 3. A pair of bosses 40 integral with the interior of the housing 10 pivotally support the axel 38,38' on either side, respectively, of the yoke 36. The axle 38 is seen to extend through the housing 10 enough to fixedly support thereon a cam-follower 42 which cooperates with a cam member 44, to be more fully explained below. The opposite end of the axle is threaded into a left-hand threaded recess in the yoke 36, and, as will be explained below, the rotary action of the cam follower 42 provides a resisting torque to the axle so as to always tighten the joint connection of the axle 38 and the yoke 36. In this way the need for spring washers or other restraint mechanisms for holding the axle position is eliminated.

Figure 4:
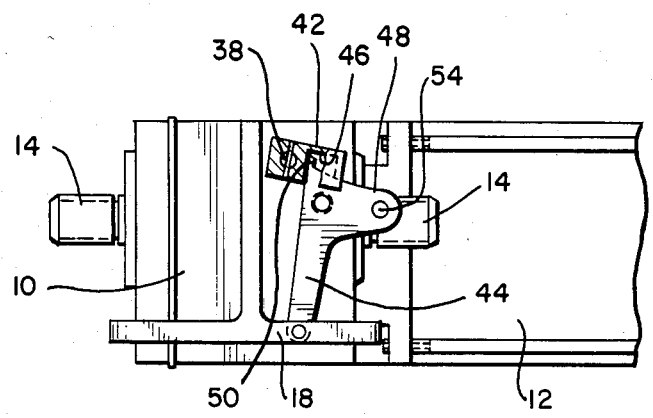
FIG. 4 is a schematic end view of the gear motor housing showing the cam follower and cam structure mounted exteriorly of the housing.

As shown in FIG. 4, the cam follower 42 is a block member having one end thereof fixedly supported by the axle or shaft 38. The front portion of the cam follower 42, that is, to the right of the shaft 38, as shown, has a cut-out portion 46 for receiving the top portion of the cam 44, specifically the sloped cam surface as well as the stop extension 50. The cam 44 is pivotally supported at its base by a pin or shaft member 52. Further, the forward portion of the cam 44 is provided with an aperture 54 for receiving a clevis or other actuating rod attachment, not shown.

Figure 5:
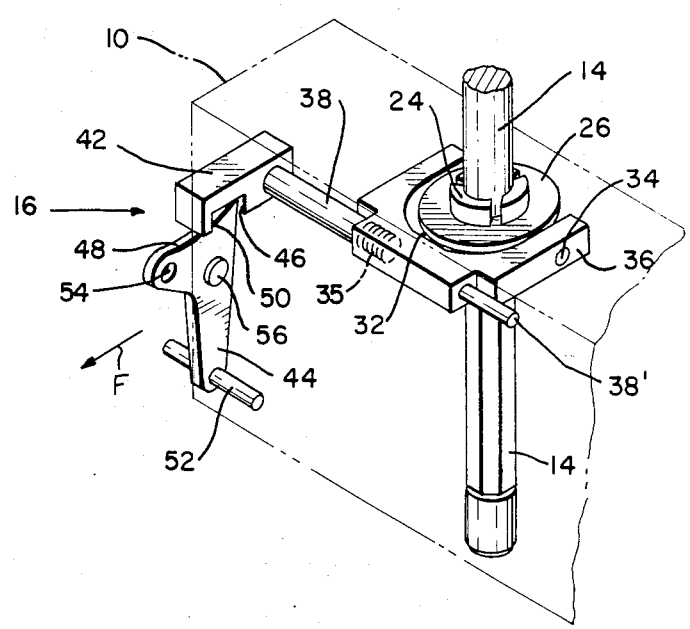
FIG. 5 is a schematic perspective view of the decoupling device according to the invention, shown in cooperation with the output shaft of the gear motor.

In FIG. 5 the decoupling member 16 is shown in perspective with the housing 10 shown in phantom. Again the output shaft 14 is shown in isolation without the final gear of the gear train. The coupler 26 is shown slidably mounted on the hexagonal section. On the top or upper side of the coupler will be seen the annular member 24 forming part of the jaw-clutch for cooperation with the corresponding jaw-clutch on the final gear of the gear train, not shown. The yoke 36 is seen mounted on the axle or shaft 38,38', one end of which fixedly supports the cam-follower 42. The shaft or axle 38' is seen to be of a smaller diameter than the shaft 38, and for this reason offers less surface resistance to the boss member 40 and, as well, need not be threaded as deeply into the yoke 36 as is the shaft 38. In fact the difference in their respective depths of insertion into the yoke 36 is directly proportional to the difference in their diameters. The cam 44 is shown pivoted on the shaft 52, and a cam spacer 54 is shown affixed to one face of the cam 44 which rubs against the housing outer wall. The cam 44 thus provides the extend stop function by means of the extension stop 50 as well as the lift function for the cam-follower 42 by means of the sloped edge 48. Further, the cam follower 42 stabilizes the cam 44 within its pivotal range and provides the retract stop for the cam 44 when it is pushed to rotate the cam-follower 42 clockwise, which by virtue of its rear face of the cut-out portion 46 provides its own displacement function.

Referring now to both FIGS. 4 and 5, the operation of the decoupling device 16, according to the invention, will now be explained. In FIG. 4 the cam-follower is shown pivoted to the clutch engaging position, that is, the jaw clutch structure is engaged so that the annular clutch members 22 and 24 are engaged and the coupler 26 is therefore engaged with the final gear 20 of the gear train (see FIG. 2). In this position it will be seen that the rear of the stop extension 50 of the cam 44 rests against the back wall of the cut-out portion 46. To activate the decoupling device the cam 44 is pulled forward (in the direction of the arrow F), which causes the cam 44 to pivot about the shaft 52. The sloped cam surface 48 is then caused to pivot the cam follower 42 counter-clockwise (looking at FIG. 4) by virtue of the front lower edge of the cam follower riding along the sloped cam surface 48 until the extension stop 50 abuts against the inner forward wall of the cut-out portion 46 of the cam-follower 42. This pivotal movement of the cam follower turns the axle or shaft 38, thus tightening the joint between the axle 38 and the yoke, as previously explained, while at the same time rotating the yoke 36 and thereby translates lhe coupler 26 along the hexagonal portion of the shaft 14 away from the final gear so that the jaw clutch structure becomes disengaged against the bias of the overcenter spring 30 on the underside of the coupler 26 (see FIG. 2), which, however, later assists the decoupling motion by snapping the cam 44 into the open position, as shown in FIG. 5. To reverse the operation, that is, initiate a coupling between the coupler 26 and the final gear 20 via their corresponding annular jaw members 22 and 24, the cam 44 is pushed in the opposite direction to that just described so that the rear of the cam just behind the stop extension 50 pushes against the rear wall of the cut-out portion 46 of the cam-follower 42 causing it to rotate slightly in a clockwise direction until the washer spring 30 assists the angular displacement of the cam-follower 42 by urging the coupler upward by means of its snap action to the clutch engaging position, that is, the position in which the coupler 26 and the final gear 20 are engaged via the annular members 22 and 24. It will be seen, therefore, that the two positions, clutch engagement and disengagement, are stable for both positions.

Since the decoupling device according to the invention is an emergency device, it is designed to offer minimal interference during normal operation of the gear motor. Unless the cam 44 is pulled to the clutch disengaging engaging position, the spring 30 keeps the respective jaw clutches engaged and no parts of the decoupling device are subject to wear. When the cam 44 is pulled it snaps to the open or disengaging position. During this movement the stubs 34 extending from the yoke 26 bear against the flange 32 of the coupler 26, but here wear is minimal in view of the magnitude of the forces involved and the infrequent use of the device for emergency operations.

The foregoing relates to a preferred embodiment of the invention, it being undrstood that other embodiments and variants thereof are possible within the spirit and scope of the invention, the latter being defined by the appended claims.

What is claimed and desired to be secured by Letters Patent of the United States is:

1. A decoupling device for a gear motor comprising,
   a housing,
   an output shaft extending throught said housing,
   a drive gear rotatably mounted on said output shaft,
   a coupler member slidably mounted on said output shaft,
   an overcenter spring mounted on said output shaft adjacent said coupler member,
   a yoke member threadably mounted on an axially rotatable shaft means and defining a threaded joint therebetween, said yoke member being connected to said coupler member for translating movement thereto along said output shaft for coupling said drive gear therewith in one end-stop position and decoupling said drive gear therefrom in another end-stop position,
   a cam-follower fixedly supported on one end of said rotatable shaft means,
   a cam pivotally supported adjacent said cam-follower for angularly displacing said cam-follower to thereby rotate said rotatable shaft means and said yoke member thereon to one of said end-stop positions, wherein rotation of said rotatable shaft towards one of said end-stop positions serves to tighten said threaded joint, and said cam-follower having spaced apart stop means for restricting the angular movement of said cam between said end-stop positions.

2. A decoupling device for a gear motor comprising, a housing, an output shaft extending through said housing, a drive gear rotatably mounted on said output shaft, a coupler member slidably mounted on said output shaft, an overcenter spring mounted on said output shaft adjacent said coupler member, a yoke member removably mounted on an axially rotatable shaft and being connected to said coupler member for translating movement thereto along said output shaft for coupling said drive gear therewith in one end-stop position and decoupling said drive gear therefrom in another end-stop position, a cam-follower fixedly supported on on end of said rotatable shaft said one end of said rotatable shaft extending through said housing, whereby said cam-follower is supported adjacent an outside wall of said housing, a cam pivotally supported adjacent said cam-follower for angularly displacing said cam-follower to thereby rotate said rotatable shaft and said yoke member thereon to one of said end-stop positions, and said cam-follower having spaced apart stop means for restricting the angular movement of said cam between said end-stop positions.

3. A decoupling device according to claim 2, wherein said one end of said rotatable shaft means extends through said housing, said cam-follower and said cam both being positioned adjacent the exterior of said housing, and the other end of said shaft means being threaded and engaging a threaded recess in said yoke member, thereby defining a joint connection with said yoke member, whereby rotation of said shaft means to one of said end-stop positions serves to tighten said joint connection.

4. A decoupling device according to claim 2, wherein said cam-follower comprises a generally rectagular member having one end thereof affixed to said rotatable shaft and the other end thereof generrly defining a cut-out U-shaped portion, the opposing end walls thereof defining said stop means for said cam.

5. A decoupling device according to claim 2, wherein said cam comprises a generally arcuate shaped member and a projection portion therefrom for cooperating with said stop means of said cam-follower.

6. A decoupling device according to claim 2, wherein said output shaft has a hexagonal portion for slidable receiving said coupler.

* * * * *

UNITED STATES PATENT AND TRADEMARK OFFICE
CERTIFICATE OF CORRECTION

PATENT NO. : 4,637,501
DATED : January 20, 1987
INVENTOR(S) : John C. Vaiden

It is certified that error appears in the above-identified patent and that said Letters Patent is hereby corrected as shown below:

Col. 2, line 68, after "recess" insert --35--

Signed and Sealed this

Twenty-fourth Day of March, 1987

Attest:

DONALD J. QUIGG

*Attesting Officer*    *Commissioner of Patents and Trademarks*